March 2, 1971  S. DUFAURE DE LAJARTE  3,567,414
METHOD AND APPARATUS FOR SUPPORTING GLASS SHEET BY
COMBINED ACTION OF LIQUID AND GAS
Filed Dec. 28, 1967
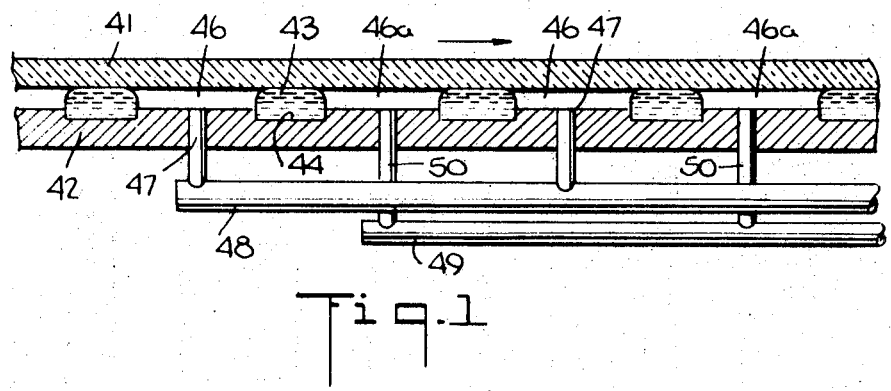
Fig. 1
Fig. 2
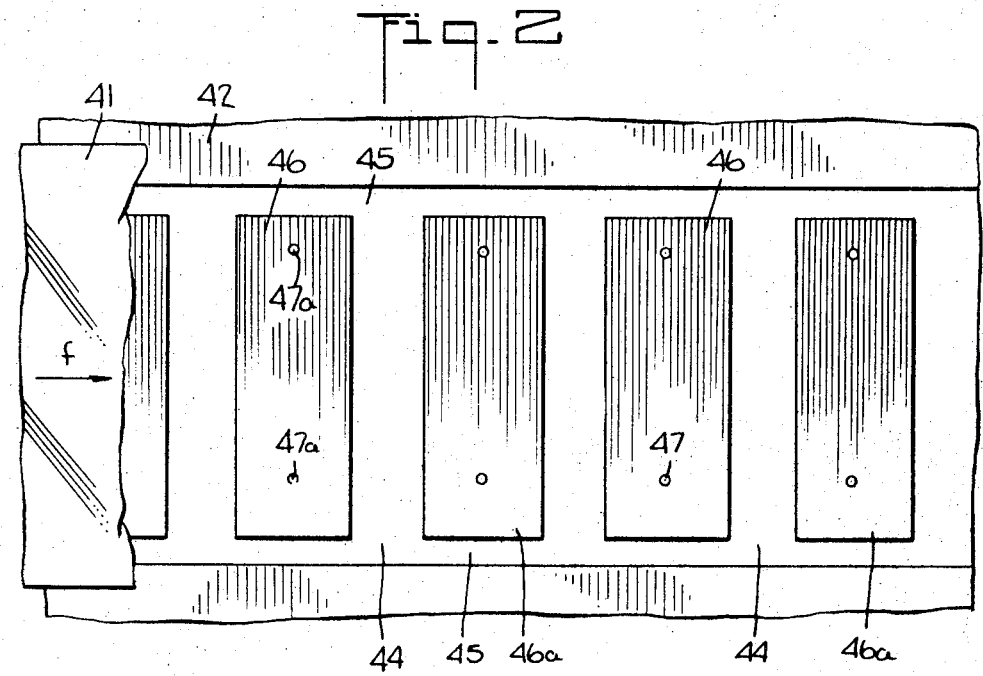
INVENTOR
STÉPHANE DUFAURE DE LAJARTE
BY
Bauer and Seymour
ATTORNEYS

United States Patent Office 3,567,414
Patented Mar. 2, 1971

3,567,414
METHOD AND APPARATUS FOR SUPPORTING GLASS SHEET BY COMBINED ACTION OF LIQUID AND GAS
Stephane Dufaure de Lajarte, Paris, France, assignor to Compagnie de Saint-Gobain, Neuilly-sur-Seine, France
Continuation-in-part of application Ser. No. 337,066, Jan. 10, 1964, now Patent No. 3,410,672. This application Dec. 26, 1967, Ser. No. 693,515
Claims priority, application France, Jan. 12, 1963, 921,331
Int. Cl. C03b 18/00, 39/00
U.S. Cl. 65—25                    9 Claims

ABSTRACT OF THE DISCLOSURE

Moving molten sheet glass is supported on liquid lands forming annuli within which gas under pressure combines to support the sheet in a flat condition. Lengths of drawn material, such as glass sheet, are sequentially passed over and in fluid-tight contact with liquid or molten metal lands forming enclosures of respective areas of the sheet instantaneously contacted and supported by the lands, while passing treating fluid into such enclosures to effect a predetermined treatment of the glass. The treating fluids are under low pressure, which assists in supporting the sheet.

---

This application is a continuation-in-part of my application Ser. No. 337,066, filed Jan. 10, 1964, now Pat. No. 3,410,672, issued Nov. 12, 1968, and claims priority of French application Ser. No. 921,231 of Jan. 12, 1963.

This invention relates to the manufacture of articles in continuous lengths and to their surface treatment. The method and apparatus are particularly adapted to the manufacture of glass and the invention will be described in that application, it being understood that the description is exemplary.

Much of the manufacture of glass is done by continuous processes, for instance the manufacture of fibers and filaments, of tubes, and of flat glass, and it may be useful to pass the article through a selected atmosphere to treat it and to impart desirable qualities. In such continuous processes the molten glass is shaped by appropriate means at an appropriate temperature and the shaped body progresses through cooling leers and through treating steps until it is brought to room temperature and wound on bobbins or cut into lengths.

It is advisable, whenever possible, to subject the glass to treatment before it is cut and accordingly the glass is passed progressively, when possible, from one treating step to another. For example, it may be useful to maintain at one location along the path of the glass a particular atmosphere or temperature whereby to act upon the surface of the glass. This localization of special conditions is difficult to achieve, particularly when the glass is still plastic, because the contact of the glass with closure means is apt to result in damage to it. For this reason the continuous process of treating glass has frequently omitted tight joints, and this has resulted in only the coarsest separation of treatments. Thus there may be uncontrolled mingling of fluids at different temperature and substantial losses which harmfully affect the cost of the process. Conditions become especially critical when it is desirable to treat the glass successively with different fluids, gaseous or liquid, which ought not to be mingled, and have produced undesirable complexity in the machinery employed.

It is an object of the invention to subject glass and other materials to progressive treatment by a series of fluids in separate chambers and to pass the glass from chamber to chamber in contact with a liquid seal. Another object of the invention is to construct apparatus for handling continuous lengths of materials progressively in various states of concretion and to subject it to different conditions without bringing the material into contact with a solid object. Another object of the invention is to form a liquid seal for a chamber through which a length of solid material may be passed without breaking the seal. Another object is to treat a moving length of glass progressively and successively with different fluids, while maintaining the glass out of contact with solids and the treating fluids out of contact with each other. Other objects of the invention will be apparent from the specification and the claims which follow.

The objects of the invention are accomplished, generally speaking, by apparatus for the treatment of a continuous length of glass comprising a supporting surface such as graphite in which are formed channels each completely surrounding one or more discrete areas over which the glass sheet passes in contact in its normal and intended path of movement. These channels are maintained filled to a level slightly above the level of the support, by a liquid which forms lands. The glass, which is not wetted by the liquid lands, passes over and in contact therewith and in cooperation with the support, the lands and the sheet itself, defines one or more closed chambers into which treating fluid is forced under low pressure and in accordance with a predetermined schedule or process of treatment, as subsequently described.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical central longitudinal section of apparatus embodying the invention, for supporting a flat moving sheet of glass out of contact with solid objects while progressively treating the surface thereof with a series of different fluids; and FIG. 2 is a plan view of the apparatus of FIG. 1.

In the following example the process is applied for protection or reaction, to one side of a moving sheet of flat glass; a sheet of newly formed glass moves over lands of molten metal which project above the supporting surface, confining the gases which are to be applied to the glass to the space between the lands, the supporting surface, and the surface of the glass.

EXAMPLE

The glass is an ordinary window glass having, for example, the following composition:

| | Percent |
|---|---|
| $SiO_2$ | 72 |
| $Al_2O_3$ | 1 |
| $Na_2O$ | 14 |
| $CaO$ | 9 |
| $MgO$ | 4 |

As it is not possible to utilize a gas containing silver, because no volatile component of silver is known, one must utilize an aerosol constituted by the action of an inert gas (nitrogen or argon) on melted silver chloride; the silver chloride has a melting point at about 455° C. and is stable up to 1550° C.

The silver chloride deposited on the sheet is thereafter reduced by means of hydrogen or a mixture of nitrogen and hydrogen containing 4 to 10% of hydrogen acting in the gaseous space between two successive lands of molten metal, tin for example.

Said treatments may be repeated in order to obtain a film of silver of the desired thickness alternating each deposit of silver with a treatment with, for example, fluorine compounds.

For the deposition of fluorine compounds it is, for example, possible to create an aerosol by the action of an inert gas on melted cryolite or to utilize gaseous compounds of fluorine, for example $SiF_4$ which react with the constituents of the molten glass at temperatures between 700 and 900° C.

The pressures utilized are between a few millimeters and 15 millimeters of water. Higher pressures would raise up the sheet and suppress the effect of the capillary seal. Pressures circa 15 mm. of water will combine with liquid lands as in FIGS. 3 and 4, to support a glass sheet of ordinary thickness, circa 6 mm. For heavier sheets more gas pressure may be used, or for lighter sheets pressure may be reduced.

In FIGS. 1 and 2 a sheet of glass 41, moving toward the right as indicated by an arrow, is carried on a graphite support 42, which in this instance is a table. The glass is supported on molten metal lands 43 which project above the top of the table and are retained in channels 44 which are formed in the top of the table. The sheet of glass is supported, in effect, by the surface tension of the lands of the molten metal. When the pressure within the chambers 46 approaches 15 millimeters of water it combines with the liquid lands to support the sheet. These channels may be of any desired shape. The transverse channels 44 are connected by two longitudinal channels 45, both containing molten metal so that the areas 46–46a between the transverse, successive lands are also closed longitudinally so that its atmosphere is confined without possibility of mixing with the atmospheres of the adjoining areas. In the drawing the channels are shown at 44 and 45, surrounding areas 46, 46a, etc., which are at the level of the bed of the table 42. Ports 47 are supplied with one type of gas from main 48 and ports 50 are supplied with a different gas through main 49. Ports 47a act to carry gas away from the chambers 46, 46a to their respective sources or places of disposal. As a result of this construction, the sheet of glass 41, which is carried on the molten metal lands, may be subjected sequentially to treatments with different gases, each of which is confined rigorously to its own chamber beneath the glass. For example, the chamber 46 may be supplied with an aerosol which will deposit silver at the temperature of the glass while the chamber 46a may be supplied with gaseous fluid capable of depositing a fluorine salt such as cryolite, which has an index of refraction different from that of the glass. The glass thus receives the deposit of a plurality of layers, for instance silver and cryolite, the thickness of which may be rigorously controlled by the duration of each exposure of the sheets to each gas, and by the number of such exposures. In each case, there is taken into consideration the temperature of the glass, the length of the chamber, the speed of the glass, and the concentration of the salt in the gas. An interference filter can be prepared by the process of this example.

In FIGS. 1 and 2 the liquid supports are parallel so that the glass would be subjected to identical treatment on its whole surface, but for many purposes it would be useful to use liquid supports which are not parallel. In such an arrangement the length of contact between the glass and the gas would vary from edge to edge, depending upon the shape of the chambers 46, 46a, and this will produce a variation in the depth of the deposit corresponding to the shape of the chambers. Thus, interference filters can be made which will pass different wave lengths of light which vary regularly from edge to edge. For example, oval chambers would produce a regular variation from the center to the longitudinal edges of the sheet of glass.

The example refers to the treatment of one side of the glass sheet but it is equally possible to treat the sheet at the same time on its upper surface by using lands of molten metal riding on the surface of the glass beneath a cover in the grooves of which the molten metal is retained.

The liquid employed for the seal shall not wet the glass. It may wet (adhere to) the wall of the aperture, or not. In either case the narrowness between the glass and the wall of the aperture retains the liquid by capillarity. The new joints permit free movement of the article in contact with the liquid without contact with the wall of the aperture. The low friction existing between the glass and the liquid prevents injury to the glass surface.

The value of these devices in obtaining certain desirable results is exemplified by the exclusion of air containing water vapor from glass at temperatures between 800 and 1000° C. at which the surface of newly formed glass is capable of forming large amounts of oxyhydriles, which modify the properties of the glass surface harmfully, producing a reduction of the mechanical characteristics, particularly a reduction of tensile strength.

When one draws glass without special precautions, the constituents of water vapor attach to the surface of the glass and initiate later chemical reactions, for example such as would color the glass or make it conductive. In these cases a closed space is established adjacent the drawing zones in which there is maintained a dry atmosphere, or an atmosphere susceptible of entering into controlled reaction with the glass.

If the temperature at the point of discharge from the chamber does not substantially exceed 300° C., the liquid may advantageously be mercury and the channels over which the glass passes may be lined with graphite, porcelain or with any other material which is not wet by the mercury.

It is advantageous, when the temperatures employed are higher, to use a molten metal such as tin, or a molten metal alloy, without reaction with the glass.

The gas which is to be confined in the chamber should be inert to the molten metal of the seal and, when the metal is oxidizable, the gas should be neutral and/or reducing. The gas may be, for example, composed of a purified argon free of oxygen and water vapor, of nitrogen, and a mixture of nitrogen and hydrogen.

It is particularly an advantage of the invention that several different gaseous treatments can be applied to the glass in successive steps while maintaining the gases apart from one another. In this way a deposit may take place on the surface of the glass, for instance by absorption or reaction, upon which subsequent and different gases may apply other coats. This method of using the invention can also be used to apply superimposed layers of different materials to a filament or sheet.

Instead of starting a reaction by passing the glass successively into separate chambers containing the reactive elements one may use the liquid which seals the joint and through which the glass passes as one of the reactive elements, either upstream or downstream of the zone containing the gas, suitable replacement of used liquid being provided for.

If the first action of the liquid on the glass is undesirable, its effect may be counteracted by the use of a subsequent treatment which removes the imperfection or annuls the unfavorable reaction. Everything which applies to the manufacture of glass fibers is equally applicable to the manufacture of films, tubes and sheets of glass by continuous methods. For example in drawing window glass it is possible to establish an atmosphere containing a mixture of $SO_2$ and $SO_3$ in contact with the glass which will react with the alkaline oxides contained in the surface of the glass. That process will, at the moment of cooling, put the surface of the glass in a condition which improves its mechanical strength and chemical durability.

The process can also be applied to drawn glass during the drawing, at which time its temperature is such as to make the process particularly efficient.

As many apparently widely different embodiments of the present invention may be made without departing from the spirit and scope thereof, it is to be understood that the invention is not limited to the specific embodiments.

What is claimed is:

1. An apparatus for supporting a flexible sheet, comprising, a base, a liquid metal annulus carried by and projecting above the upper surface of the base, said annulus having an upper surface which forms a support for the sheet by surface tension and forms with the contiguous surface thereof a free space completely surrounded by said annulus, means to introduce a gas under pressure to said free space, and means to maintain the gas within said annulus at a pressure adequate to support the sheet out of contact with the base.

2. Apparatus according to claim 1, in which the annulus is molten metal and the sheet to be carried is molten glass.

3. Apparatus according to claim 2 in which the base supporting the glass sheet is subdivided into a plurality of discrete annuli, as aforesaid, each of which is supplied with gaseous support under pressure.

4. The method of supporting a ribbon of molten glass which comprises maintaining the ribbon out of contact with solid objects by the joint and combined action of closed liquid lands over and in contact with which the ribbon is located, to thereby form with each land a closed, fluid-tight chamber, and gas under pneumatic pressure confined within each chamber.

5. Apparatus for the treatment of a face of a glass sheet, comprising, a support, a channel in the support completely surrounding an area thereof, a metallic liquid in the channel which is non-adherent to the sheet and projects above the channel, conduit means having port means within the area surrounded by the channel, and means to flow a treating fluid through the conduit means into the space between the support and the glass sheet surrounded by said channel.

6. Apparatus according to claim 5 in which a flat surface constitutes the support, and the channel includes conjoined longitudinal and transverse channel means.

7. Apparatus for the treatment of sheet glass in motion which comprises, a table, endless channels each defining an enclosure to maintain a non-adherent metallic liquid projecting above the surface of the table, and serving as supports for the glass sheet, and conduit means opening within the respective enclosures defined by said channels, to introduce a treating fluid between said channels.

8. Apparatus for the treatment of a moving length of flat glass which comprises, a flat surface having endless molten metal lands projecting above the surface thereof to form with the flat surface and the sheet of glass a series of separate chambers, and means to flow different treating fluids for the glass into the respective chambers, said molten metal lands forming barrier means between the chambers.

9. The method of treating a moving sheet of glass, comprising, forming at least one liquid metal land on and completely surrounding a limited area of a base to thereby form a support for the sheet, and to define with the base and superposed sheet a free enclosed space, and flowing treating gas into said enclosed space.

References Cited
UNITED STATES PATENTS 3,437,469  4/1969  Pychés _____ 65—99A S. LEON BASHORE, Primary Examiner R. L. LINDSAY, JR., Assistant Examiner U.S. Cl. X.R.

65—65, 99, 182